Figure 1:
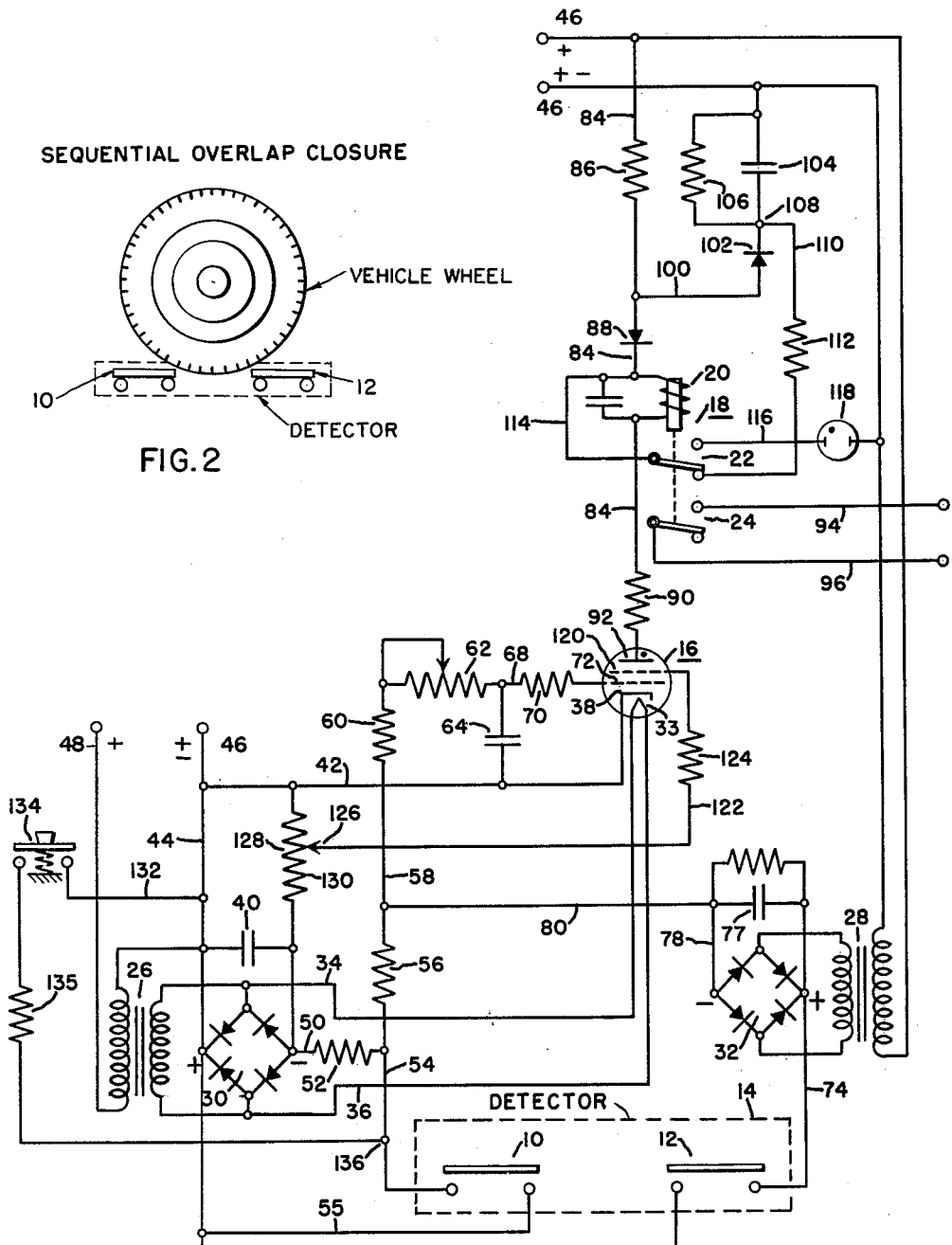

FIG.2 SEQUENTIAL OVERLAP CLOSURE

INVENTOR:
WALTER M. JEFFERS,
BY D. EMMETT THOMPSON
HIS ATTORNEY.

3,137,838
LOW SPEED VEHICLE DETECTION SYSTEM
Walter M. Jeffers, Syracuse, N.Y., assignor to Crouse-Hinds Company, Syracuse, N.Y., a corporation of New York
Filed Mar. 7, 1960, Ser. No. 13,139
4 Claims. (Cl. 340—31)

This invention has as an object a new and improved vehicle detection system which functions to detect the passage of vehicles over a detector traveling at less than a predetermined speed whereby the passage of slow moving traffic over the vehicle detector may be utilized, for example, to change the cycle settings in a traffic control system in order to adjust the traffic controller system to the presence of the slow moving traffic.

Briefly described the invention comprises a vehicle detector which is positioned in the street wherein the vehicle detector includes a pair of spaced contacts which are closed in sequence by the vehicles moving over the detector. The spacing of the contacts is such that vehicles passing over the detector close the contacts in a sequential overlapping fashion whereby the second contact pair closes before the opening of the first contact pair so as to obtain two successive pulses. The time from the start of the first pulse to the start of the second pulse is directly dependent upon the speed of the car. When this then exceeds a preselected value a control tube is rendered conductive to energize a relay which may be connected to a traffic control system, or the like, to effect a change in the system to adjust the system to the presence of the slow moving traffic.

The invention consists in the novel features and in the combinations and constructions hereinafter set forth and claimed.

In describing this invention, reference is had to the accompanying drawing in which like characters designate corresponding parts in all the views.

In the drawings: FIGURE 1 illustrates a circuit comprising the preferred embodiment of the invention.

FIGURE 2 is a schematic illustration showing the passage of a vehicle wheel over the detector of the circuit shown in FIGURE 1.

Referring to the drawing the detector comprising first and second contacts 10 and 12 mounted in a detector indicated by the dashed lines 14 which is positioned in one lane of the street or highway on which it is desired to detect the passage of the slow moving vehicles.

The distance between the contacts 10 and 12 in the detector 14 is such that the contacts will be closed in overlapping sequential fashion by the passage of a vehicle over the detector 14, the contact set 12 being closed before the opening of contact set 10.

The detector circuit includes timing means and sensing means which may take the form of a gas filled control tube, generally indicated at 16, and a output relay, generally indicated at 18 having a coil 20 and two sets of contacts 22 and 24. The detector circuit also comprises transformers 26 and 28 and bridge rectifiers 30 and 32. the heater 33 of the control tube 16 which may be a gas filled tetrode is connected to the secondary coil of the transformer 26 by lines 34 and 36 whereby to heat the cathode 38 of the tube 16.

The bridge rectifier 30 is connected across the lines 34 and 36 and a filter capacitor 40 is connected in parallel with the bridge rectifier 30 in order to provide a D.C. power supply. The positive side of the bridge rectifier, indicated by the plus sign, and the tube cathode 38 are both connected, by lines 42 and 44 respectively, to the common or ground side 46 of a 110 volt 60 cycle A.C. power supply having a hot side 48.

The D.C. negative side of the bridge rectifier 30, as indicated by the negative sign in the drawing, is connected by line 50 through a resistor 52 to line 54 which is connected at one end through the detector contact set 10 when actuated to ground potential 55. The line 54 is also connected through resistors 56 and 60 and a potentiometer 62 to one side of timing means which includes a timing capacitor 64, the opposite side of which is connected by line 42 and line 44 to the common side 46 of the power supply.

The negative side of the capacitor 64 is connected by line 68 through a resistor 70 to the control element of the sensing means which in the embodiment disclosed herein comprises a control grid 72 located in the tube 16. The rectifier 30, in the example shown in the drawing, holds the top of the capacitor and the grid at about 8 volts negative.

When a car passes over the detector the front wheels first close the contact set 10 which connects the negative side of the bridge rectifier 30 to ground. This causes the capacitor 64 which had been previously charged as above described to approximately minus 8 volts to discharge through the potentiometer 62 and the resistors 60 and 56. As will be obvious the time it takes to completely discharge the capacitor 64 is determined by the setting of the potentiometer 62 and the value of the resistors 60 and 56. When the front wheels of the vehicle pass over the detector 14 and close the second set of the detector contacts 12 before the contact set 10 is opened, the positive side, indicated by the plus sign, of the bridge rectifier 32 is connected by line 74 through the closed contact set 12 to a ground potential 76. The bridge rectifier 32 has a filter capacitor 77 connected across the rectifier in order to provide the D.C. power supply and a resistor is shown as connected across the capacitor to discharge the capacitor 77 when the power supply is removed from the capacitor. The resistor is connected across the capacitor 77 for an additional purpose. The rectifier bridge 32 will hold the charge on line 80 up to the required negative potential but without the resistor a stray positive voltage leak into the wire 74 could raise the voltage potential on the wire 80 above the normal amount. The rectifier 32 will not prevent this but the resistor connected across the rectifier acts to prevent any such occurrence from taking place. The negative side of the bridge rectifier 32, indicated by the minus sign, is connected by lines 78 and 80 to the negative side of the resistor 56. Consequently, the closing of the second set of detector contacts 12 halts the discharge of the capacitor 64, even though the front wheels of the vehicle are still holding the first set of detector contacts 10 closed. Consequently, the capacitor 64 is re-charged by the closing of the detector contacts 12.

The time interval between the closing of the first set of contacts 10 and the second contacts 12 is determined by the speed of the vehicle passing over detector 14. If the vehicle is moving slowly enough the closing of the second set of contacts 12 occurs after the capacitor 64 has been discharged, by the closing of the contacts 10, to a point where the grid 72 approaches ground potential (in the example this is approximately minus one volt) permitting the tube to become conductive. When the tube becomes conductive output means which in the embodiment herein disclosed comprises a pluse circuit is completed from the hot side of the power supply 48 through line 84, resistor 86, rectifier 88, coil 20 of relay 18 and resistor 90 which is connected to the plate 92 of the tube 16. When the tube is conducting the circuit is completed through the tube to line 42 and line 44 to the common side 46 of the power supply, thus energizing the relay 18.

The energization of the relay 18 closes the normally open contacts 24 completing a circuit through the lines 94 and 96 which may be connected to any suitable means (not shown) such as means, for example, for adjusting the traffic control system to the presence of the slow moving traffic.

In order to permit the tube 16 to become conductive, the plate 92 is provided with a steady D.C. power supply through a circuit comprising line 84 which is connected to the hot side 48 of the power supply, resistor 86, line 100, and capacitor 104 which is connected to the common side 46 of the power supply. A resistor 106 is connected across the capacitor 104 to discharge the capacitor when the power supply is removed from the capacitor 104. This circuit holds the point 108 at full positive line voltage when the capacitor 104 is fully charged thereby providing plate 92 of the tube 16 with a positive D.C. power supply through the circuit comprising line 110 which is connected to the point 108, resistor 112, back contact of relay 18, armature 22, line 114, to line 84 and through the coil 20 of relay 18 and resistor 90 in the line 84 to the plate 92.

When the grid 72 loses a sufficient amount of negative bias by the closing of the detector contact 10, as previously set forth, the tube fires and the grid 72 loses control of the tube. When the tube 16 first begins to conduct, it is fed by the steady D.C. power from the rectifier 102 and the filter capacitor 104 as set forth above. This steady D.C. current flow causes the relay 18 to become energized moving the armature 22 away from the back contact to the front contact thereby disconnecting the steady D.C. supply to the plate 92.

This armature movement also completes a circuit from the hot feed line 48 through line 84, line 114, armature 22, front contact and line 116 through a neon pilot light 118 into the common or return line 46. The pilot light 118 is thus energized and indicates the relay closure.

As previously set forth the energization of relay 18 serves to move the armature 24 into engagement with its contact thereby completing the circuit through line 94 and 96 for the adjustment of the traffic control system to the presence of slow moving traffic.

When the armature 22 of relay 18 is moved from the back contact, as shown in the drawing, upward to the front contact, the plate 92 of the tube 16 is provided with pulsating half-wave direct current from the hot line 48 through the line 84, resistor 86, rectifier 88, coil 20 and resistor 90. This serves to restore control to the grid 72 so that it can stop the flow of current when the grid 72 is rendered sufficiently negative again through the detector contact set 12, as previously described.

A calibrating device is incorporated in the circuit to provide for varying line voltages and tube characteristics, which may vary considerably. The calibrating device consists of a second grid 120 located in the tube 16, the grid 120 being connected by line 122 through a current limiting resistor 124 to the movable contact 126 of a calibrating pot 128 having a resistor 130.

To calibrate the circuit, the grid 72 is connected through the resistor 70 and capacitor 64 to the line 42 and line 44 which is connected by line 132 through a test switch 134 and resistor 135 to the point 136 in the line 54. The closing of the test button 134 shunts down the voltage bias on the grid 72 and the test button 134 is held closed and the calibrating pot 128 is moved upward along the resistor 130 until the neon pilot 118 just comes on or flashes indicating the tube has become conductive. This calibrating device permits the circuit to be calibrated when the tube 16 is replaced by a new tube having different characteristics and the circuit may also be calibrated if there should be a variation in the power supply voltage.

Resistors 52, 56, 86, 90, 112 and 135 are current limiting resistors utilized to achieve the desired characteristics from standard components used in the circuit.

The potentiometer 62 in the line 58 is provided in order to permit selective variation of the time it takes for the capacitor 64 to discharge to the point where the tube 16 becomes conductive. As previously set forth, this time is related to the time interval between the closing of the contact sets 10 and 12 of the detector 14 whereby by use of the potentiometer 62 the circuit may be adjusted to vary the response of the circuit to vehicle speeds. That is, in some instances it may be desirable, for example, to have the circuit become activated in response to vehicles passing over the vehicle detector at speeds of say, less than 15 miles per hour whereas in other instances it may be desirable to make the circuit responsive only to vehicles passing over the detector at speeds less than 25 miles per hour. The use of the potentiometer 62 permits this variation in the response of the circuit.

As will be obvious, the vehicle detector comprising this invention may be utilized in the third or left turn lane of a street or highway whereby vehicles intending to turn left approaching an intersection will actuate the device as they slow up to make the desired left turn. Consequently, the lines 94 and 96 may be connected to the traffic controller for the intersection and as the slow-moving left-turn vehicles cross over and actuate the detector the traffic controller will be operated to permit the left turn of the vehicles.

What I claim is:

1. A vehicle detection system operable to detect the passage of vehicles over a vehicle detector at less than a preselected velocity, said system comprising a D.C. power supply, a vehicle detector having first and second sets of contacts, said sets of contacts positioned to be closed sequentially in over-lapping fashion by the passage of a vehicle wheel over said detector, one side of each set of said contacts being connected to a common power-supply potential and the opposite side of each set of contacts being connected by first and second circuit means respectively to a timing capacitor and voltage sensing means having a control element, means connecting said control element to said capacitor, said sensing means conducting current in response to a pre-determined charge on said capacitor, means connecting said capacitor to the D.C. power supply whereby said capacitor is normally charged by said power supply to hold said control element at a sufficient potential to prevent said sensing means from conducting current, the closing of said first set of contacts establishing said first circuit means through said first set of contacts to change the charge on said capacitor, thereby changing the potential on said control element toward the point where said sensing means becomes conductive, the closing of said second set of contacts within a predetermined time interval establishing said second circuit means through said second set of contacts to said capacitor to restore the charge on said capacitor to its normal value to prevent said sensing means from operating, output means connected to said sensing means and responsive to the current conduction of said sensing means to indicate the presence of a slowly-moving vehicle.

2. The vehicle detection system of claim 1, wherein said sensing means comprises a gas discharge tube having a plate circuit and a control grid, said plate circuit being normally supplied from a D.C. power supply, means in said plate circuit actuated by current conduction of said tube for disconnecting said D.C. power supply to said plate circuit and substituting pulsating current to said plate circuit to restore control of said tube to said grid, when said first set of contacts remain closed for a predetermined time interval sufficient to discharge said capacitor to the point where said tube conducts current.

3. The vehicle detection system of claim 1, wherein said output means comprises a relay provided in the output circuit of said sensing means, said relay being energized upon current conduction in said sensing device to indicate the presence of slowly moving traffic.

4. The vehicle detection system of claim 1, wherein said system is provided with calibrating means, said calibrating means including a switch means for applying a predetermined voltage to said sensing means and variable means for adjusting the current conducting point of said sensing means to conduct current upon application of said predetermined voltage to said sensing means by said switch means.

References Cited in the file of this patent

UNITED STATES PATENTS

| | | |
|---|---|---|
| 2,796,595 | Schulenberg | June 18, 1957 |
| 2,877,454 | Zedlar et al. | Mar. 10, 1959 |

FOREIGN PATENTS

| | | |
|---|---|---|
| 390,389 | Great Britain | Apr. 6, 1933 |